United States Patent Office 3,428,641
Patented Feb. 18, 1969

3,428,641
METHYLATION OF PYRIDINES
Richard C. Myerly, Charleston, W. Va., and Kurt Weinberg, Upper Saddle River, N.J., assignors to Union Carbide Corporation, a corporation of New York
No Drawing. Continuation-in-part of application Ser. No. 396,407, Sept. 14, 1964. This application Oct. 27, 1967, Ser. No. 678,497
U.S. Cl. 260—290                 10 Claims
Int. Cl. C07d 31/02, 31/20

ABSTRACT OF THE DISCLOSURE

Pyridine compounds are methylated at a position alpha to the heterocyclic nitrogen atom by contact with an organic compound capable of forming methyl radicals in the presence of a catalyst of nickel and nickel oxide. A typical illustration of the process is methylation of pyridine by contact with methanol to produce α-picoline.

---

The instant invention relates to a novel process for effecting the substitution of the pyridine ring. This invention specifically provides a novel method for selective alkylation, particularly for methylation of a broad spectrum of pyridine compounds. This application is a continuation-in-part of Ser. No. 396,407, filed Sept. 14, 1964 now abandoned.

Despite the aromatic nature of the pyridine ring, pyridine compounds cannot be alkylated with Friedel-Crafts catalysts as are aromatic compounds. Consequently a number of diverse methods have been developed for the preparation of alkyl pyridines. For example, α-picoline has been prepared by heat-pyridinium methyl iodide to 300° C., and small yields of about 3 percent methylpyridines have been obtained by vapor phase reaction of methanol and pyridine at 400° C. to 500° C. Another method for introducing a methyl group in a pyridine ring has been by heating pyridine in acetic or propionic acid with lead acetate in the presence of a small amount of an organic active hydrogen-containing compound.

The novel process of this invention provides a useful and economic process to directly methylate a pyridine ring. For example, the novel process of this invention provides an economically attractive route to synthesize the 2,6-lutidine and the like. Applicants' copending application Ser. No. 396,404, filed Sept. 14, 1964, now U.S. Patent 3,334,101 provides also a novel process to demethylate pyridine compounds using a similar catalyst to that of the instant invention.

In accordance with this invention there is provided a novel process for selectively methylating pyridine compounds by contacting the pyridine compounds in the presence of a nickel-nickel oxide catalyst with an organic compound capable of producing methyl groups over such a catalyst. By virtue of the directive effect of the heterocyclic nitrogen atom of the pyridine compound to be methylated, the methyl groups will initially add primarily at a position alpha to the heterocyclic nitrogen. It accordingly is possible to selectively methylate a broad spectrum of pyridine compounds to add one or more methyl groups, and to do so selectively, introducing methyl groups at desired positions. For example, pyridine may be methylated to obtain α-picoline and this product may be subsequently further methylated to obtain 2,6-lutidine.

According to the process of this invention, a methyl group is substituted for a hydrogen atom at the alpha position of a pyridine ring. Accordingly the starting materials are characterized by a hydrogen substituent in the position alpha to the heterocyclic pyridyl nitrogen atom. The pyridine compounds useful in the novel process of this invention contain at least one integral pyridine ring alone or as part of a fused polycyclic structure comprising at least one and up to two integral pyridine rings. These structures include pyridine, polycyclic compounds wherein the pyridine ring is fused to a homocarbocyclic ring such as quinoline, isoquinoline and compounds wherein two pyridine rings are fused together such as the naphthyridines, e.g., 1,5-naphthyridine, 1,6-naphthyridine, 1,7-naphthyridine, 1,8 - naphthyridine, 2,6 - naphthyridine, 2,7-naphthyridine, and the like. It is understood that the useful starting materials are the alpha hydrogen substituted derivatives of the above compounds, however it is pointed out that these compounds may be additionally substituted at other positions preferably with alkyl groups. Such alkyl groups remain for the most part completely unaffected by the methylation. Highly preferably these alkyl groups contain up to 4 carbon atoms. These preferred pyridine compounds may therefore be characterized as consisting of carbon, hydrogen and one to two heterocyclic nitrogen atoms corresponding to the number of fused pyridine rings in the compound.

It will be understood that by regulating process factors such as contact time a one-step methylation may be made to yield 2,6-lutidine from pyridine. In the following table various exemplary starting materials are listed together with the methyl-substituted products which may be produced therefrom by alkylation according to the instant method. The list is illustrative and not limiting inasmuch as it is deemed within the skill of the chemist to extrapolate the principles embodied herein so as to produce other compounds from analogous starting materials.

| Starting Material: | Product |
|---|---|
| Pyridine | α-picoline |
| α-picoline | 2,6-lutidine |
| γ-picoline | 2,4-lutidine |
| β-picoline | 2,5-lutidine |
| 2,4-lutidine | 2,4,6-trimethylpyridine |
| 3-ethylpyridine | 2-methyl-5-ethylpyridine |
| 3-hexylpyridine | 2-methyl-5-hexylpyridine |
| 2-methyl-5-ethylpyridine | 2,6-dimethyl-3-ethylpyridine |
| 4-propylpyridine | 2-methyl-4-propylpyridine |
| 2-methyl-4-propylpyridine | 2,6-dimethyl-4-propylpyridine |
| Quinoline | 2-methylquinoline |
| 2-methylquinoline | 2,4-dimethylquinoline |
| 2-pentylquinoline | 2-pentyl-4-methylquinoline |
| Isoquinoline | 2-methylisoquinoline |
| 1-methylisoquinoline | 1,3-dimethylisoquinoline |
| 1,8-naphthridine | 2-methyl-1,8-naphthridine |
| 2-methyl-1,8-naphthridine | 2,7-dimethyl-1,8-naphthridine |

The novel process is carried out by contacting the pyridine compounds with a compound which is capable of producing methyl groups. Compounds which are capable of forming methyl radicals in the presence of the catalyst of the instant invention include compounds consisting of carbon, hydrogen and free from additional atoms other than oxygen in the form of ether groups, ester groups, orthoester groups, ether linkages, acetal groups, or keto groups.

The methylating agents of this invention may be structurally represented by the formulae:

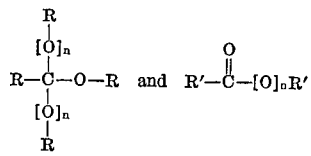

where in each instance $n$ is 0 or 1, R is hydrogen or alkyl and R' is alkyl.

Preferred are compounds containing up to a total of 10 carbon atoms. The compounds structurally represented above include alcohols, esters including orthoesters, ketones, ethers, and acetals having up to 10 carbon atoms highly preferably up to 5 carbon atoms. Exemplary of the compounds which will produce methyl radicals over the nickel-nickel oxide catalyst in accordance with this invention are the alkanols such as methanol, ethanol, n-propanol, isopropanol, n-butanol, pentanol, 2-methyl-5-pentanol, hexanol, 2-ethylhexanol, octanol, decanol, and the like, alkyl esters such as ethyl formate, triethyl orthoformate, methyl acetate, ethyl acetate, butyl acetate, 2-propyl propionate, ethyl butyrate, methyl hexanoate and the like, saturated ethers such as methyl ethyl ether, and diethyl ether, ketones such as acetone, methyl ethyl ketone, diethyl ketone, acetals such as methylal, and the like. Saturated alkanes such as methane, ethane and the like may be employed, however these compounds do not readily produce methyl groups as readily as those above and consequently result in poorer yields of product.

The reaction is conducted in the vapor phase at elevated temperatures. Depending upon the pyridine compound to be reacted and the organic compound used to provide methyl radicals the temperature may vary from about 150° C. to about 400° C. The preferred range will vary with the particular reactants employed. For example the reaction of pyridine and methanol to α-picoline begins at about 210° C. and proceeds most efficiently in the range of from about 265° C. to about 295° C. For most reactants the process may be suitably conducted within the range of from 250° C. to 320° C.

The alkylation according to the instant invention takes place in the presence of a nickel-nickel oxide catalyst. Suitable catalysts include stabilized nickel and nickel oxide containing less than 50 percent and preferably about 30 to 40 percent free nickel and are preferably employed in finely divided form. The catalysts may be prepared by partial reduction of nickel oxide. The catalyst is employed with a gross support such as kieselguhr, silica, clay or the like, but is also extremely effective if used alone without support. The specificity of the nickel-nickel oxide catalysts for the instant alkylation reaction was singular and surprising, since the use of other catalysts, such as nickel alone or kieselguhr, or nickel and chromium oxide failed to result in even half the yield of the instant catalyst although higher temperatures were employed. Other catalysts, such as nickel on montmorillonite, copper, cobalt on alumina, and barium promoted with copper chromite produced at best traces of the desired methylated product.

The mole ratio between the organic compound producing methyl radicals and the pyridine compound is preferably such as to maintain the organic methyl radical producing compound in excess. Mole ratios in the range of from 1:1 to 20:1 may be employed, and optimization of the mole ratio must be determined in light of the yields and of the cost of the specific reactants. For example the yield of α-picoline by reaction of pyridine and methanol is raised from about 40 percent to about 57 percent by raising the mole ratio of methanol:pyridine from 1.8:1 to about 15:1. However, a high yield of almost 51 percent can be obtained by reacting ethyl orthoformate and pyridine in a mole ratio of 1.3:1.

As hereinbefore stated the reaction is conducted in the vapor phase and is preferably carried out by passing the reactants over the heated catalyst bed. Contact times are not critical to the reaction and may vary from about 0.5 to as high as 50 seconds, more usually from about 2 to 15 seconds. Here also the ideal contact time will vary with the reactants employed. Illustrative of this is the fact that at 275° C. an increase in contact time for a methanol-pyridine mixture from about 6 to 11 seconds produces a small decrease in yield while a large yield with triethylorthoformate is obtained after a contact time of over 20 seconds. It is preferred to conduct the process in a heated tubular reactor or the like.

Pressure is entirely non-critical, and the process may be conducted at subatmospheric, atmospheric, or superatmospheric pressures. Although operation at pressures higher than atmospheric might be deemed desirable process-wise, no appreciable advantage accrues using subatmospheric pressure.

The following examples are illustrative.

In all examples the catalyst employed was nickel/nickel oxide containing about 60 to 70 percent by weight nickel, with a ratio of reduced nickel to total nickel of 0.55 to 0.65 and about 1 percent by weight nickel sulfide.

Example I

A mixture of methanol and pyridine in a mole ratio of 7.9 to 1 was vaporized in a preheater. The vapors were passed over a catalyst of nickel/nickel oxide maintained in an externally heated tubular reactor having a length of 3 feet and an inside diameter of 1¼ inches. The catalyst temperature was 295° C. Contact time was 10.5 seconds. The exiting vapors were condensed and collected. The product mixture was shaken with aqueous sodium hydroxide and the organic layer was extracted with benzene. Distillation of the benzene extract yielded α-picoline in an amount corresponding to 53 percent of theoretical yield.

Examples II–XV

The reaction was run employing various starting materials. The conditions and results are summarized in Table I below. The equipment and procedure was similar to Example I.

TABLE I.—ALKYLATION OF PYRIDINE COMPOUNDS

| Example | Starting Pyridine Compound | Alkylating Agent | Catalyst Temp., °C. | Mole Ratio Alkylating Agent/Pyridine | Contact Time, Sec. | Product | Yield, percent of Theory |
|---|---|---|---|---|---|---|---|
| II | α-Picoline | Methanol | 260–5 | 3.6:1 | 12.2 | 2,6-lutidine | 10.8 |
| III | γ-Picoline | do | 260 | 3.6:1 | 11.5 | 2,4-lutidine | 21.0 |
| IV | β-Picoline | do | 265–9 | 3.7:1 | 12.2 | 2,5-lutidine | 54.7 |
| V | Quinoline | do | 260 | 4.0:1 | 13.4 | 2-methylquinoline | 65.5 |
| VI | Pyridine | Ethanol | 262–5 | 3.0:1 | 11.6 | α-Picoline | 61.2 |
| VII | do | n-Propanol | 300 | 2.5:1 | 11.4 | do | 52.0 |
| VIII | do | Acetone | 325 | 2.5:1 | 12.0 | do | 42.0 |
| IX | do | Isopropanol | 295 | 2.1:1 | 12.2 | do | 38.0 |
| X | do | n-Butanol | 296–300 | 2.1:1 | 14.0 | do | 48.2 |
| XI | do | Isobutanol | 296–300 | 2.1:1 | 14.0 | do | 25.2 |
| XII | do | Methylal | 250–267 | 2.3:1 | 14.0 | do | 55.0 |
| XIII | do | Methyl Orthoformate | 250–260 | 1.3:1 | 20.6 | do | 56.8 |
| XIV | do | Ethyl acetate | 290–305 | 1.65:1 | 16.2 | do | 57.5 |
| XV | do | Methane | 259–261 | 3.8:1 | 19.8 | do | 9.6 |

What is claimed is:

1. A process for selectively substituting a methyl group for a hydrogen atom in at least one of the positions alpha to the heterocyclic nitrogen atom of a pyridine compound which comprises contacting said pyridine compound with a methylating compound capable of producing methyl groups, said methylating compound consisting of carbon, hydrogen, and oxygen in the form of hydroxyl groups, ester groups, orthoester groups, keto groups, acetal groups and ether linkages, in the presence of a catalyst of nickel and nickel oxide at a temperature of from about 150° to about 400° C.

2. A process for selectively substituting a methyl group for a hydrogen atom in at least one of the positions alpha to the heterocyclic nitrogen atom of a pyridine compound containing at least one and up to two integral pyridine rings, said pyridine compound consisting of carbon, hydrogen, and up to 2 heterocyclic nitrogen atoms, which comprises contacting said pyridine compound with a methylating compound selected from the group consisting of the formula:

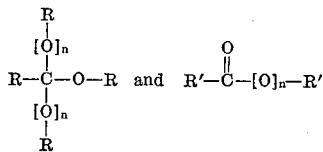

wherein $n$ is an integer from 0 to 1, R is selected from the group of hydrogen and alkyl, R' is alkyl; in the presence of a catalyst of nickel and nickel oxide at a temperature of from about 150° to about 400° C.

3. The process of claim 2 wherein the methylating compound is an alkanol.

4. The process of claim 3 wherein the methylating agent is methanol.

5. A process for selectively substituting a methyl group for a hydrogen atom in at least one of the positions alpha to the heterocyclic nitrogen atom in a compound selected from the group consisting of pyridine and alkyl pyridines which comprise contacting said pyridine compound with a methylating compound having up to 10 carbon atoms selected from the group consisting of compounds of the formulae:

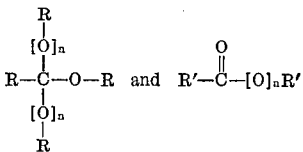

wherein $n$ is an integer of from 0 to 1, R is selected from the group consisting of hydrogen and alkyl and R' is alkyl; in the presence of a catalyst of nickel and nickel oxide at a temperature of from 150° to 400° C.

6. The process of claim 5 wherein the methylating compound is methanol.

7. The process of claim 5 wherein the methylating compound is acetone.

8. The process of claim 5 wherein the methylating compound is an ester containing 2 to 5 carbon atoms.

9. The process of claim 5 wherein the pyridine compound is pyridine.

10. The process of claim 5 wherein the pyridine compound is picoline.

References Cited

UNITED STATES PATENTS 2,502,174   3/1956   Rieger _____ 260—283

ALEX MAZEL, *Primary Examiner.*

D. G. DAUS, *Assistant Examiner.*

U.S. Cl. X.R.

260—296, 283; 252—472, 449, 466, 468; 260—478, 632, 601